(12) United States Patent
Pillgram-Larsen et al.

(10) Patent No.: US 9,348,582 B2
(45) Date of Patent: May 24, 2016

(54) SYSTEMS AND METHODS FOR SOFTWARE DEPENDENCY MANAGEMENT

(71) Applicant: LinkedIn Corporation, Mountain View, CA (US)

(72) Inventors: Jens Pillgram-Larsen, Pleasanton, CA (US); Paul McDill Hobbs, Sunnyvale, CA (US); Jarek Rudzinski, Oakland, CA (US); Dustin Kwong, San Francisco, CA (US); Swee Boon Lim, Cupertino, CA (US)

(73) Assignee: LinkedIn Corporation, Mountain View, CA (US)

( * ) Notice: Subject to any disclaimer, the term of this patent is extended or adjusted under 35 U.S.C. 154(b) by 164 days.

(21) Appl. No.: 14/179,894

(22) Filed: Feb. 13, 2014

(65) Prior Publication Data

US 2015/0227363 A1    Aug. 13, 2015

(51) Int. Cl.
- G06F 9/44     (2006.01)
- G06F 9/45     (2006.01)
- G06F 9/445    (2006.01)
- G06F 11/36    (2006.01)

(52) U.S. Cl.
CPC .. G06F 8/71 (2013.01); G06F 8/60 (2013.01); G06F 8/65 (2013.01); G06F 11/3664 (2013.01); G06F 8/34 (2013.01)

(58) Field of Classification Search
CPC .............. G06F 8/71; G06F 8/61; G06F 8/63; G06F 8/60; G06F 8/65; G06F 8/70; G06F 8/34; G06F 8/36; G06F 8/38; G06F 9/44536; G06F 11/2247; G06F 11/368; G06F 11/3684; G06F 11/3664; G06F 8/47; G06F 8/67
See application file for complete search history.

(56) References Cited

U.S. PATENT DOCUMENTS

| 5,649,200 | A   | * | 7/1997  | Leblang ............ G06F 8/71  |
|           |     |   |         | 707/999.202                    |
| 6,154,878 | A   | * | 11/2000 | Saboff ............ G06F 8/67   |
|           |     |   |         | 707/999.202                    |
| 6,185,734 | B1  | * | 2/2001  | Saboff ............ G06F 8/67   |
|           |     |   |         | 707/999.202                    |
| 7,093,232 | B1  | * | 8/2006  | Chatzigianis ...... G06F 8/71   |
|           |     |   |         | 717/122                        |
| 8,359,571 | B2  | * | 1/2013  | Clemm ............. G06F 8/71   |
|           |     |   |         | 717/120                        |
| 2004/0168153 | A1 | * | 8/2004  | Marvin ............ G06F 8/71   |
|           |     |   |         | 717/120                        |
| 2006/0112854 | A1 | * | 6/2006  | Leu ............... B82Y 30/00  |
|           |     |   |         | 106/38.28                      |

(Continued)

OTHER PUBLICATIONS

Kreetta Askola et al., Vulnerability dependencies in antivirus software, IEEE 2008, [Retrieved on Jan. 5, 2016]. Retrieved from the internet: <URL: http://ieeexplore.ieee.org/stamp/stamp.jsp?tp=&arnumber=4622594> 6 Pages (273-278).*

(Continued)

*Primary Examiner* — Thuy Dao
*Assistant Examiner* — Anibal Rivera
(74) *Attorney, Agent, or Firm* — Schwegman Lundberg & Woessner, P.A.

(57) ABSTRACT

Techniques for managing software dependencies are described. For example, a dependency specification that pertains to a first product is accessed. The product may be a collection of artifacts and may provide a software functionality. A determination may be made, based on the dependency specification, that the first product has a dependency on a second product. Metadata pertaining to the second product may be accessed. A valid version of the second product may be identified based on the metadata. The valid version may be usable at build time of the first product.

18 Claims, 6 Drawing Sheets

(56) References Cited

U.S. PATENT DOCUMENTS

| | | | | |
|---|---|---|---|---|
| 2006/0253834 A1* | 11/2006 | Cacenco | G06F 8/34 | 717/107 |
| 2008/0163161 A1* | 7/2008 | Shaburov | G06F 8/34 | 717/105 |
| 2008/0163162 A1* | 7/2008 | Shaburov | G06F 8/34 | 717/105 |
| 2008/0301667 A1* | 12/2008 | Rao | G06F 8/61 | 717/172 |
| 2008/0320460 A1* | 12/2008 | Miller | G06F 8/71 | 717/162 |
| 2009/0049288 A1* | 2/2009 | Weissman | G06F 8/70 | 712/245 |
| 2009/0133012 A1* | 5/2009 | Shih | G06F 8/65 | 717/169 |
| 2009/0210855 A1* | 8/2009 | Ramanathan | G06F 8/36 | 717/102 |
| 2009/0300604 A1* | 12/2009 | Barringer | G06F 11/3664 | 717/178 |
| 2010/0269099 A1* | 10/2010 | Yoshimura | G06F 8/36 | 717/122 |
| 2010/0318968 A1* | 12/2010 | Traut | G06F 8/36 | 717/122 |
| 2013/0067463 A1* | 3/2013 | Ito | G06F 8/60 | 717/178 |
| 2013/0174133 A1* | 7/2013 | Goetz | G06F 8/47 | 717/140 |
| 2014/0201726 A1* | 7/2014 | Asselin | G06F 8/71 | 717/170 |
| 2014/0289719 A1* | 9/2014 | Dewan | G06F 8/71 | 717/170 |

OTHER PUBLICATIONS

Pietro Abate et al., Predicting Upgrade Failures Using Dependency Analysis, IEEE 2011, [Retrieved on Jan. 5, 2016]. Retrieved from the internet: <URL: http://ieeexplore.ieee.org/stamp/stamp.jsp?tp=&arnumber=5767626> 6 Pages (145-150).*

"Gradle User Guide Version 1.9", Copyright © 2007-2012 Hans Dockter, Adam Murdoch, [Online]. Retrieved from the Internet: <URL: http://www.gradle.org/docs/1.9/userguide/userguide_single.html>, (Accessed May 29, 2014), 209 pgs.

* cited by examiner

SYSTEMS AND METHODS FOR SOFTWARE DEPENDENCY MANAGEMENT

TECHNICAL FIELD

The present disclosure generally relates to data processing systems. More specifically, the present disclosure relates to methods, systems, and computer program products for managing software dependencies.

BACKGROUND

Often, software applications are designed to use other, previously existing software components. This dependency of software applications on other software components or artifacts (e.g., libraries) may result in numerous dependency problems, such as long chains of dependencies, conflicting dependencies, and circular dependencies.

In some instances, a software application may have a dependency on a particular version of a first artifact (e.g., a library). The software application may also have a dependency on a second artifact which, in turn, has a dependency on a different version of the first artifact. Traditionally, such a version conflict between dependencies is resolved at the artifact level.

DESCRIPTION OF THE DRAWINGS

Some embodiments are illustrated by way of example and not limitation in the FIGS. of the accompanying drawings, in which.

DETAILED DESCRIPTION

The present disclosure describes methods, systems, and computer program products for managing software dependencies. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

In software development, a computer-implemented product (or a "computing application") may include a collection of heterogeneous artifacts assembled together for the purpose of providing a particular software functionality. Often, during the development of a computer-implemented product (hereinafter also a "product"), rather than writing every single line of code expressly for the product, developers may use certain software development artifacts (e.g., units of code) that are not part of the product in order to accomplish a particular functionality of the product. This use of software development artifacts external to a product may allow for a more efficient allocation of resources within the company, a higher product quality, and a faster release of the product.

The dependency of a product on a software development artifact (also "artifact") may be declared within the code that pertains to the product. An artifact may be software code (a Java jar artifact, a Spring artifact, a Java script, a programming language, a framework, an application, a UI component, etc.), a data item (e.g., a variable, a record, a structure, etc.), or a by-product of the software development process (e.g., documentation, a resource, a technology, metadata, a use case, a diagram, a specification, a design, an illustration, a requirement, a drawings, etc.) It is not uncommon for different versions of the same artifact to be used by different products, especially in the context of a large organization that develops numerous products.

In some example embodiments, a system for managing software dependencies (also the "dependency management system") may allow the elevation of software dependencies from the artifact level to the product level. When dependencies are declared at the product level, a first product may have a dependency on a particular version of a second product. Before declaring the dependency of the first product on the particular version of the second product, the dependency management system may test and verify that the particular version of the second product functions properly (e.g., the components of the particular version of the second product work with each other). As a result of the product dependency declaration, in some example embodiments, the first product may only use versions of artifacts that appear within the particular version of the second product. The first product may not be able to use a version of an artifact that is not present in the particular version of the second product. Because the dependencies are declared at the product level, the dependency management system may also allow the resolution of dependency conflicts at the product level. In some instances, certain rules for dependency resolution may be used to resolve dependency conflicts at the product level.

According to some example embodiments, to manage a product's dependencies on other products' versions, the dependency managements system may programmatically use a dependency graph (e.g., a Directed Acyclic Graph (DAG)). A dependency graph may include nodes that represent products and edges connecting the nodes. The edges may represent dependencies between products. Further, developers may use tools that represent dependencies graphically (e.g., a dependency graph that illustrates the relationships and the dependencies among different products) in order to better understand the dependencies that pertain to one or more products.

In some example embodiments, the dependency management system may manage the life-cycles of product versions. A version of a product may have a life cycle (e.g., a duration, a life span, etc.) and a number of life-cycle stages. The dependency management system may manage the changes associated with a version of a product moving through various stages of the version's life cycle.

According to some example embodiments, the first stage in the life cycle of a version of a product is the publication of the particular version. At publication time, the version may be available for the public to use or for another product to depend on.

The second stage in the life cycle of the version is the deprecation of the version. At deprecation time, the end-of-life date that pertains to the particular version is set (e.g., specified). The end-of-life date indicates that, at a future point in time, the particular version is no longer available for use. In some instances, the deprecation of a particular product version is useful when planning to stop supporting the particular product version. For example, a 90-day end-of-life date may be set for a particular version from the deprecation date. An alerting tool associated with the dependency management system may alert users (e.g., developers, administrators, etc.) to the approaching end-of-life date of the particular version and may suggest migrating (or upgrading) to a newer version of the product. In some example embodiments, the dependency management system may push an upgrade (e.g. a new version) into a product.

The product version enters the third stage in its life cycle when the version is "end-of-lifed" (e.g. discontinued, terminated, revoked, cancelled, ended, etc.) This is the time when the version can no longer be actively used. The version is retained until it is pruned at a later life-cycle stage. In some instances, a version may be "end-of-lifed" immediately (e.g., due to a security vulnerability or a bug). As a result, the version may no longer be deployed, used, or consumed from another product. According to some example embodiments, before a version is end-of-lifed, the dependency management system verifies that there is at least one version of the product that is not end-of-lifed. If the dependency management system attempts to end-of-life the only available version it may fail.

The fourth and final stage in the life cycle of the version is the pruning of the version. The version is pruned (e.g., removed, cleared, deleted, etc.) when the version is no longer reachable by any other node in the dependency graph. The version may be retained between the time it is "end-of-lifed" and the time it is pruned for a possible performance of a hot fix of a running version of an application. For example, a situation may present itself when the dependency management system may need to revert to using the "end-of-lifed" product version.

In certain example embodiments, the dependency management system may also include information discovery tools. It may be beneficial to understand, especially in a large software development organization, how products relate: what products depend on a particular product, what other products the particular product depends on, how is the code in the organization related, etc. However, the larger the organization, the larger the code base. Therefore, it is not an easy task for a developer in such an organization to understand and manage dependencies (including transitive dependencies). The dependency management system may include tools for discovering not only dependencies of various products but also, based on the organizational metadata, the people or the groups of people responsible for developing and maintaining particular products. These discovery tools may assist in answering questions about products and in tracking and monitoring changes that pertain to the products (e.g., code changes, version upgrades, life-cycle stage transitions, etc.) For example, a code vulnerability or bug was fixed in a unit of code (e.g., a product version). One or more of the discovery tools may track which of the consumers (e.g., one or more products) of the unit of code have been upgraded to use the revised unit of code and which ones have not. In some example embodiments, the dependency management system may automatically upgrade the code of one or more consumers by, for example, pushing an upgrade (e.g., a newer version, a valid version, etc.) into the code that pertains to the respective consumers. The automatic monitoring of the products' life cycles and upgrading of product versions are not only beneficial to the dependency management system but may also facilitate the processes of agile development, continuous integration, and continuous delivery.

Figure 1:
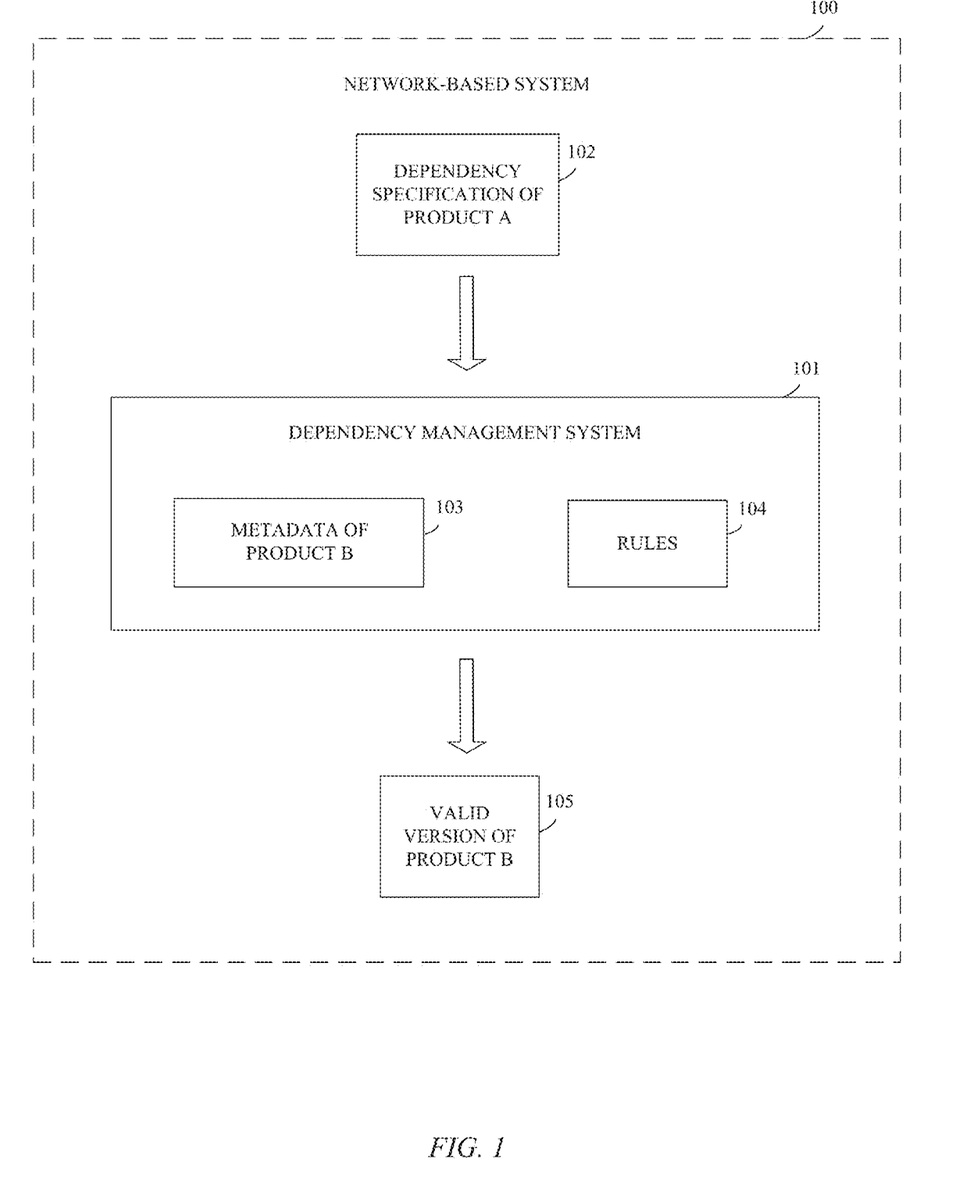
FIG. 1 is a functional representation of an example dependency management system, according to various example embodiments.

FIG. 1 is a functional representation of an example dependency management system 101 for managing software dependencies of products, according to various example embodiments. In some example embodiments, the dependency management system 101 is included in a network-based system 100. As described in more detail below, the dependency management system 101 may access (e.g., receive) a dependency specification of product A 102. The dependency specification of product A 102 may be a file that specifies (e.g., declares) one or more dependencies of product A on one or more other products. Based on the dependency specification of product A 102, the dependency management system 101 determines, using at least one computer processor, that product A has a dependency on a product B.

Based on a dependency specified in the dependency specification of Product A 102, the dependency management system 101 may identify and access metadata of product B 103. In some example embodiments, the metadata of product B 103 includes information pertaining to one or more versions of product B, a live date for each of the one or more versions of product B, an end-of-life date for each of the one or more versions of product B, and a pruned-version flag that indicates that a particular version of product B is not usable. In some example embodiments, the metadata of product B 103 is included in a catalogue file that pertains to product B.

Based on the metadata of product B 103, the dependency management system 101 may identify a valid version of product B 105 using one or more rules 104 for identifying (e.g., selecting) a valid version of a product. The valid version of product B 105 may be usable at build time of product A. In some example embodiments, to identify the valid version of product B 105, the dependency management system 101 may determine the respective life-cycle stages of one or more versions of product B and then may select the valid version of product B 105 from the one or more versions of product B based on a rule 104 and respective life-cycle stages of one or more versions of product B. An example rule 104 may specify that no "pruned" or "end-of-lifed" versions of a product may be selected as a valid version of the product.

Figure 2:
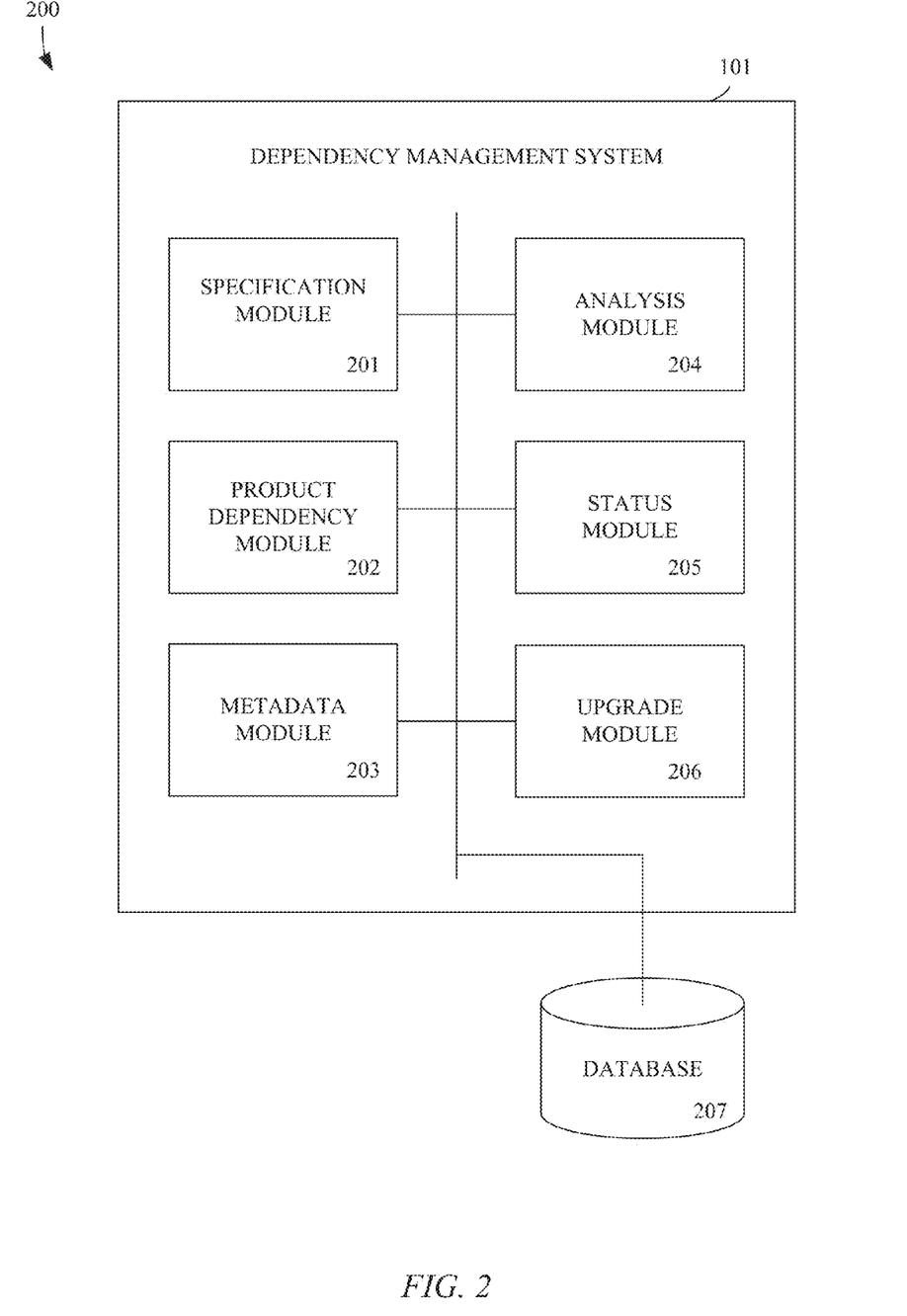
FIG. 2 is a block diagram of certain modules of an example dependency management system, consistent with some example embodiments.

FIG. 2 is a block diagram of certain modules of an example dependency management system, consistent with some example embodiments. Some or all of the modules of system 200 illustrated in FIG. 2 may be part of the dependency management system 101. As such, system 200 is described by way of example with reference to FIG. 1.

The system 200 is shown to include a number of modules that may be in communication with each other. One or more modules of the system 200 may reside on a server, client, or other processing device. One or more modules of the system 200 may be implemented or executed using one or more hardware processors. In some example embodiments, one or more of the depicted modules are implemented on a server of the network-based system 100. In FIG. 2, the dependency management system 101 is shown as including a specification module 201, a product dependency module 202, a metadata module 203, an analysis module 204, a status module 205, and an upgrade module 206 configured to communicate with each other (e.g., via a bus, shared memory, or a switch). Also shown in FIG. 2 is a database 207 configured to communicate with one or more modules of the dependency management system 101.

The specification module 201 is configured to access (e.g., receive) a dependency specification that pertains to a first product. As described above, the product may be a collection of artifacts and may provide a software functionality. The artifacts may be heterogeneous. For example, an artifact may be a unit of code or resource (e.g., an executable, a code library, a test suite, etc.), a database, or a non-code component of the product (e.g., documentation, a use case, a diagram, a model, a requirement, a design, etc.) The dependency specification may be a file that specifies the dependencies of the first product on one or more other products. The dependency specification may be stored in one or more records of the database 207. According to some example embodiments, the dependency specification that pertains to the first product is accessed by the specification module 201 at build time of the first product. Additionally or alternatively, the dependency specification that pertains to the first product may be accessed by the specification module 201 at various other times (e.g., after one or more code changes that pertain to the first product, when the first product undergoes testing, etc.)

The product dependency module 202 is configured to determine, based on the dependency specification that pertains to the first product, that the first product has a dependency on a second product. For example, the product dependency module 202 may determine based on the data included in the dependency specification that pertains to the first product that the first product depends on a particular version of the second product. The particular version of the second product may or may not be usable at build time of the first product.

The metadata module 203 is configured to access metadata pertaining to the second product based on the determination that the first product has a dependency on the second product. In some example embodiments, the metadata pertaining to the second product may include data such as information pertaining to one or more versions of the second product, a live date for each of the one or more versions, an end-of-life date for each of the one or more versions, a pruned-version flag that indicates that a particular version is not usable, product(s) on which the second product depends, product(s) that depend on the second product, etc. In certain example embodiments, the metadata pertaining to the second product is included in a catalogue file that includes information pertaining to one or more versions of the second product. Each of the one or more versions of the second product may have an end-of-life date that indicates a date when the particular version can no longer be used.

The analysis module 204 is configured to identify a valid version of the second product based on the metadata pertaining to the second product. The valid version of the second product may be used (e.g., is usable) at build time of the first product. In certain example embodiments, the dependency management system 101 may receive a command to build the first product. In response to receiving the command, the dependency management system 101 may execute the command to build the first product based on the valid version of the second product.

In some example embodiments, the identifying of the valid version includes selecting, based on the metadata pertaining to the second product, a version of the one or more versions of the second product having an end-of life date that has not transpired. According to certain example embodiments, the selecting includes: determining that one or more of the versions of the second product have end-of life dates that have not transpired and selecting the valid version from the one or more of the versions that have end-of life dates that have not transpired based on applying a version selection rule to the one or more of the versions that have end-of life dates that have not transpired. The version selection rules may be stored in one or more records of the database 207.

An example version selection rule may specify the selection of the highest available version of all versions of a product. Another example version selection rule may require the selection of the highest available version among a range of versions of the product. A version selection rule may utilize a wild card "*" to indicate the selection of the highest available version among a range of versions. For example, the rule may state "use 1.*.*." At build time, the dependency management system may pick the highest available version number that matches this pattern.

According to various example embodiments, the identifying of the valid version includes confirming that the valid version functions at a pre-determined level of quality of service based on testing the valid version according to one or more quality of service criteria. The quality of service criteria may be stored in one or more records of the database 207.

In various example embodiments, the second product has a plurality of versions. Each of the plurality of versions may have a life-cycle expiring on an end-of-life date associated with the respective version of the second product. The identifying of the valid version may include: calculating a period of time remaining in the respective life-cycle of each of the versions of the second product based on the end-of-life date of each of the versions; identifying one or more of the versions of the second product that have a corresponding calculated period of time that is equal to or greater than a pre-determined threshold period; and selecting the valid version from the identified one or more of the versions according to a version selection rule. In some example embodiments, the version selection rule may require selecting the highest version of the second product. In certain example embodiments, the version selection rule may require selecting a particular version of the second product.

In some example embodiments, the analysis module 204 is further configured to identify, based on the metadata pertaining to the second product, a third product that has a dependency on a vulnerable version of the second product. The vulnerable version may be a version that has code including a code vulnerability.

The status module 205 is configured to identify, based on the metadata pertaining to the second product, a status of each of one or more versions of the second product including the valid version. In some example embodiments, the identifying of the valid version is based on the identified status of the valid version. For example, the status module 205 may determine that a particular version of the second product is recently published, is not "end-of-lifed", and is not pruned. The analysis module 204 may identify the particular version as the valid version based on the determination that the particular version is recently published, is not "end-of-lifed", and is not pruned.

The upgrade module 206 is configured to upgrade dependencies of products. In some example embodiments, as described above, the analysis module 204 may identify, based on the metadata pertaining to the second product, a third product that has a dependency on a vulnerable version of the second product. The vulnerable version may be a version that has code including a code vulnerability. For example, using the metadata pertaining to the second product (e.g., data about which products depend on which versions of the second product), the analysis module 204 may identify a third product specified as having a dependency on a particular version of the second product. The particular version of the second product may be known to have a code vulnerability.

The upgrade module 206 may upgrade the dependency of the third product based on the valid version of the second product. In some example embodiments, the upgrading of the dependency may include pushing the valid version of the second product into the third product.

In certain example embodiments, the dependency of the third product on the vulnerable version of the second product is indicated in a dependency specification that pertains to the third product. The upgrading of the dependency may include changing a version identifier in the dependency specification from a first identifier that specifies the vulnerable version to a second identifier that specifies the valid version.

Any two or more of these modules may be combined into a single module, and the functions described herein for a single module may be subdivided among multiple modules. Furthermore, according to certain example embodiments, the modules described herein as being implemented within a single machine, database, or device may be distributed across multiple machines, databases, or devices.

Figure 3:
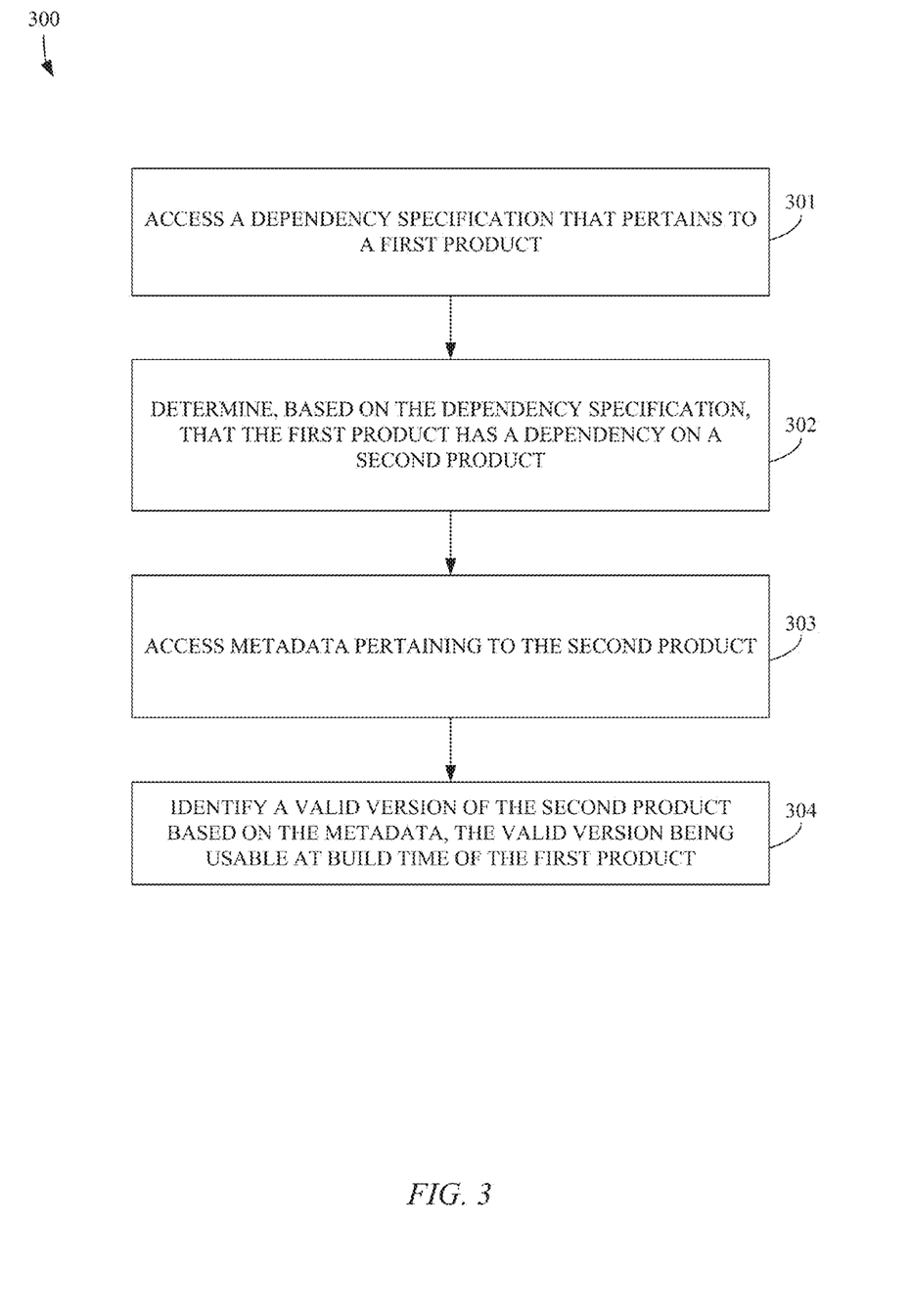
FIG. 3 is a flowchart diagram illustrating method steps of an example method for managing software dependencies, consistent with some example embodiments.

FIG. 3 is a flowchart diagram illustrating method steps of an example method for managing software dependencies, consistent with some example embodiments. The inventive subject matter may be implemented for use with applications that utilize any of a variety of network or computing models, to include web-based applications, client-server applications, or even peer-to-peer applications.

Consistent with some example embodiments, the method begins at method operation 301, when the specification module 201 accesses (e.g., receives) a dependency specification that pertains to a first product. The dependency specification may be stored in one or more records of the database 207. The product may be a collection of artifacts and may provide a software functionality.

At method operation 302, the product dependency module 202 determines, based on the dependency specification, that the first product has a dependency on a second product. The second product may have one or more versions. According to certain example embodiments, information pertaining to the one of more versions of the second product may be part of metadata pertaining to the second product. In some example embodiments, the metadata pertaining to the second product is included in a catalogue file associated with the second product. The metadata may include information pertaining to the one or more versions of the second product, such as a live date for each of the one or more versions, an end-of-life date for each of the one or more versions, a pruned-version flag that indicates that a particular version is not usable, etc. The metadata may be stored in one or more records of the database 207.

At method operation 303, the metadata module 203 accesses (e.g., retrieves) the metadata pertaining to the second product. Next, at method operation 304, the analysis module 304 identifies a valid version of the second product based on the metadata. The identifying of the valid version of the second product may include applying a version selection rule 104 to one or more versions of the second product. The valid version may be used at build time of the first product.

Figure 4:
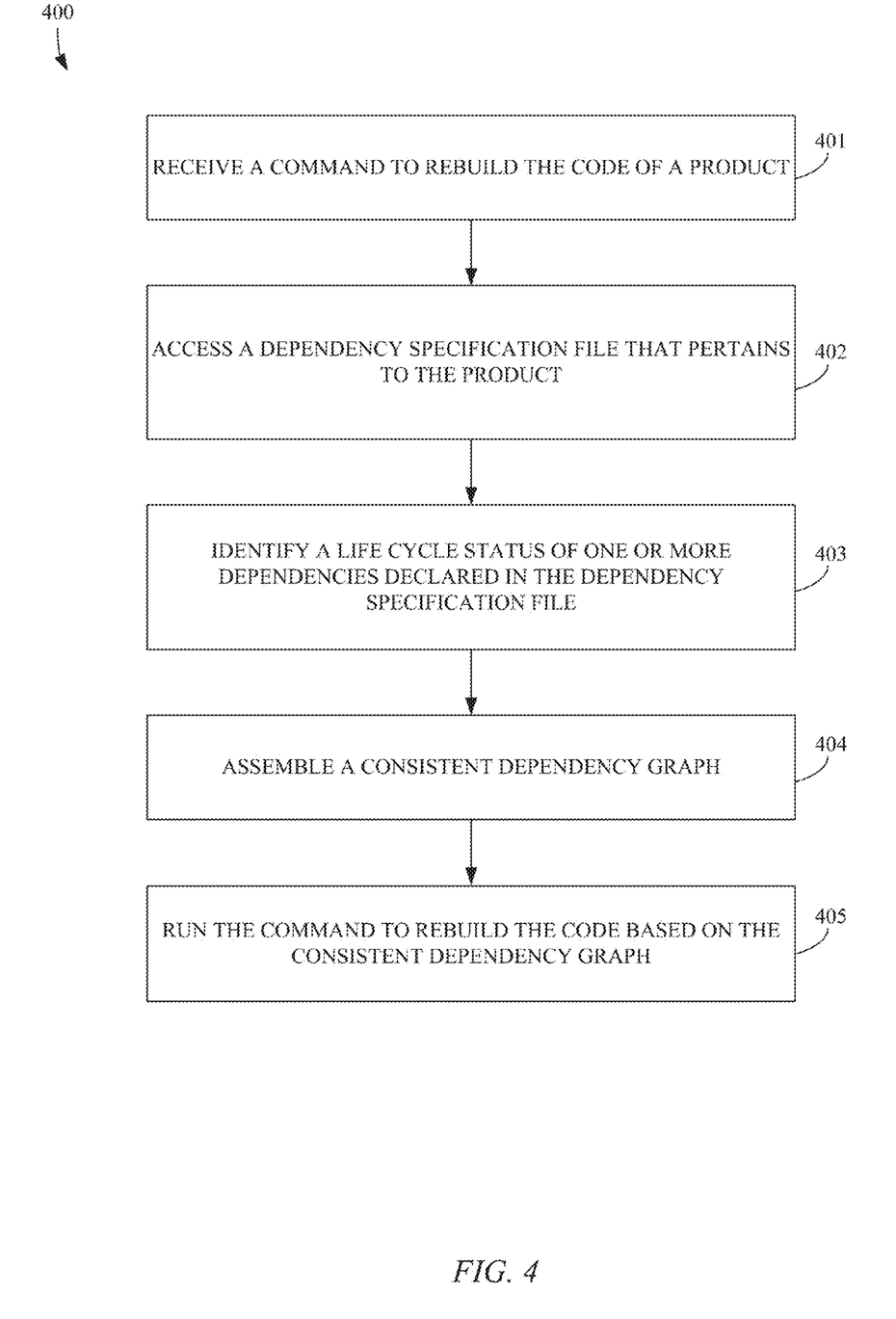
FIG. 4 is a flowchart diagram illustrating method steps of an example method for managing software dependencies, consistent with some example embodiments.

FIG. 4 is a flowchart diagram illustrating method steps of an example method for managing software dependencies, consistent with some example embodiments. The inventive subject matter may be implemented for use with applications that utilize any of a variety of network or computing models, to include web-based applications, client-server applications, or even peer-to-peer applications.

Software code of a product may need to be rebuilt after one or more changes are made to the code pertaining to the product or to the code pertaining to another product on which the product depends. Consistent with some example embodiments, the method begins at method operation 401, when the dependency management system 101 receives a command to rebuild the code of a product.

At method operation 402, the specification module 201 accesses a dependency specification (e.g., a dependency specification file) that pertains to the product. The accessing of the dependency specification may or may not be based on (e.g., in response to receiving) the command. Based on the dependency specification, the dependency management system 101 (e.g., the product dependency module 202) may identify one or more dependencies declared in the dependency specification. For example, the dependency specification may specify that the product (e.g., product A) has dependencies on product X.version1, product Y.version3, and product Z. version 6.

At method operation 403, the status module 205 identifies a life cycle status for each of the one or more dependencies declared in the dependency specification. In some instances, the life cycle status of a dependency corresponds to a particular stage in the life cycle of a product version that is a dependency of the product undergoing the code rebuild. According to certain example embodiments, the status module 205 identifies a life cycle status for each of one or more transitive dependencies that pertain to the product undergoing the code rebuild.

At method operation 404, the analysis module 204 assembles (e.g., computes) a consistent dependency graph for the product. In some example embodiments, assembling a consistent dependency graph includes resolving any existent dependency conflicts (e.g., a conflict due to two products depending on different versions of a third product). The dependency conflicts may be resolved based on applying a conflict resolution rule (e.g., a version selection rule) that may be stored in a record of the database 207. Method operations 402, 403, and 404, in some example embodiments, may be performed based on receiving the command to rebuild the code of the product at method operation 401. In other example embodiments, method operations 402, 403, and 404 may be performed independently of (e.g., prior to) receiving a command to rebuild the code of the product.

At method operation 405, the dependency management system 101, in response to the command to rebuild the code of the product, runs the command to rebuild the code of the product based on the consistent dependency graph.

Figure 5:
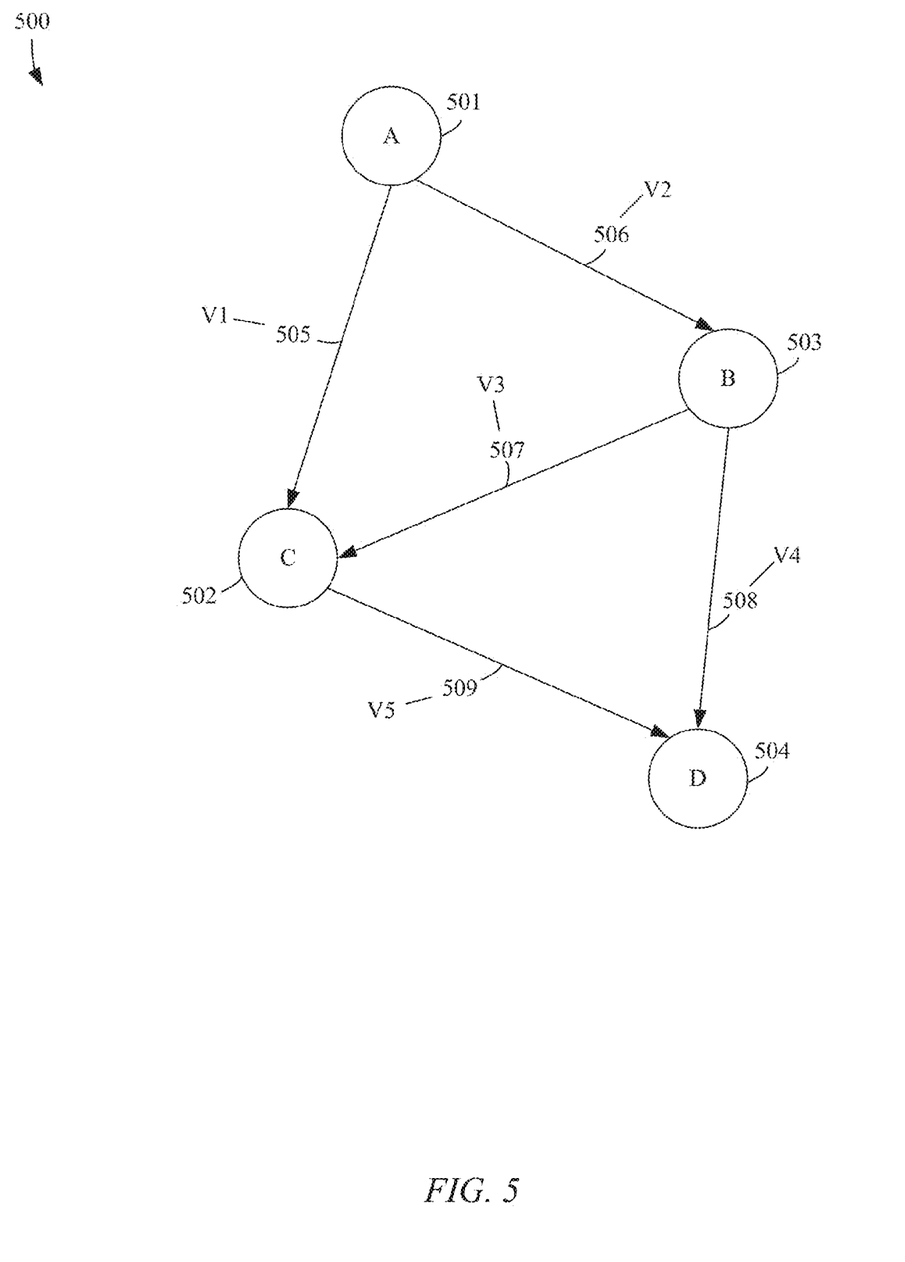
FIG. 5 is a block diagram illustrating an example of a portion of a graph data structure for implementing a dependency graph, according to various example embodiments.

FIG. 5 is a block diagram illustrating an example of a portion of a graph data structure 500 for implementing a dependency graph, according to various example embodiments. As illustrated in FIG. 5, the graph data structure 500 consists of nodes connected by directed edges (e.g., arrows). For instance, the node with reference number 501 is connected to the node with reference number 502 by means of the arrow with the reference number 505. Each node in the graph data structure represents a product. For example, node 501 represents product A, node 502 represents product C, node 503 represents product B, and node 504 represents product D. An arrow that connects any two nodes represents a dependency between one product and a version of another product. For example, arrow 505 starting at the node 501 and ending at the node 502 represents the dependency of product A on version 1 (e.g., V1) of product C. Arrow 507 starting at the node 503 and ending at the node 502 represents the dependency of product B on version 3 (e.g., v3) of product C.

The dependency management system 101 may determine whether the dependencies, as declared, are resolvable (e.g., available, non-circular, etc.) For example, if V1 is the same as V3, then either version may be used. If V1 is newer than V3, the later version V1 is backwards compatible with the older version V3 and both V1 and V3 may be used. Product B may use V3. Because V1 is backwards compatible with V3, V1 may be used in product A. If, however, V1 is older than V3, the dependency management system may issue a build failure error due to an effective forcing of a downgrade of product C from the newer V3 to the earlier V1.

In some example embodiments, after determining that a dependency was declared using an incompatible (or a vulnerable) version, the dependency management system 101 identifies a valid version that may be used instead of the incompatible version. The dependency management system 101 may request the particular product to use the valid version (e.g., may push the valid version of the dependency into the product). In certain example embodiments, to identify the valid version of the dependency product, the dependency management system 101 identifies one or more versions of the dependency product that are in the first or second stages of their respective life cycles using the metadata of the dependency product. Then, using one or more rules of version selection, the dependency management system 101 may select the valid version from the identified one or more versions of the dependency product.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules or objects referred to herein may, in some example embodiments, comprise processor-implemented modules and/or objects.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 6:
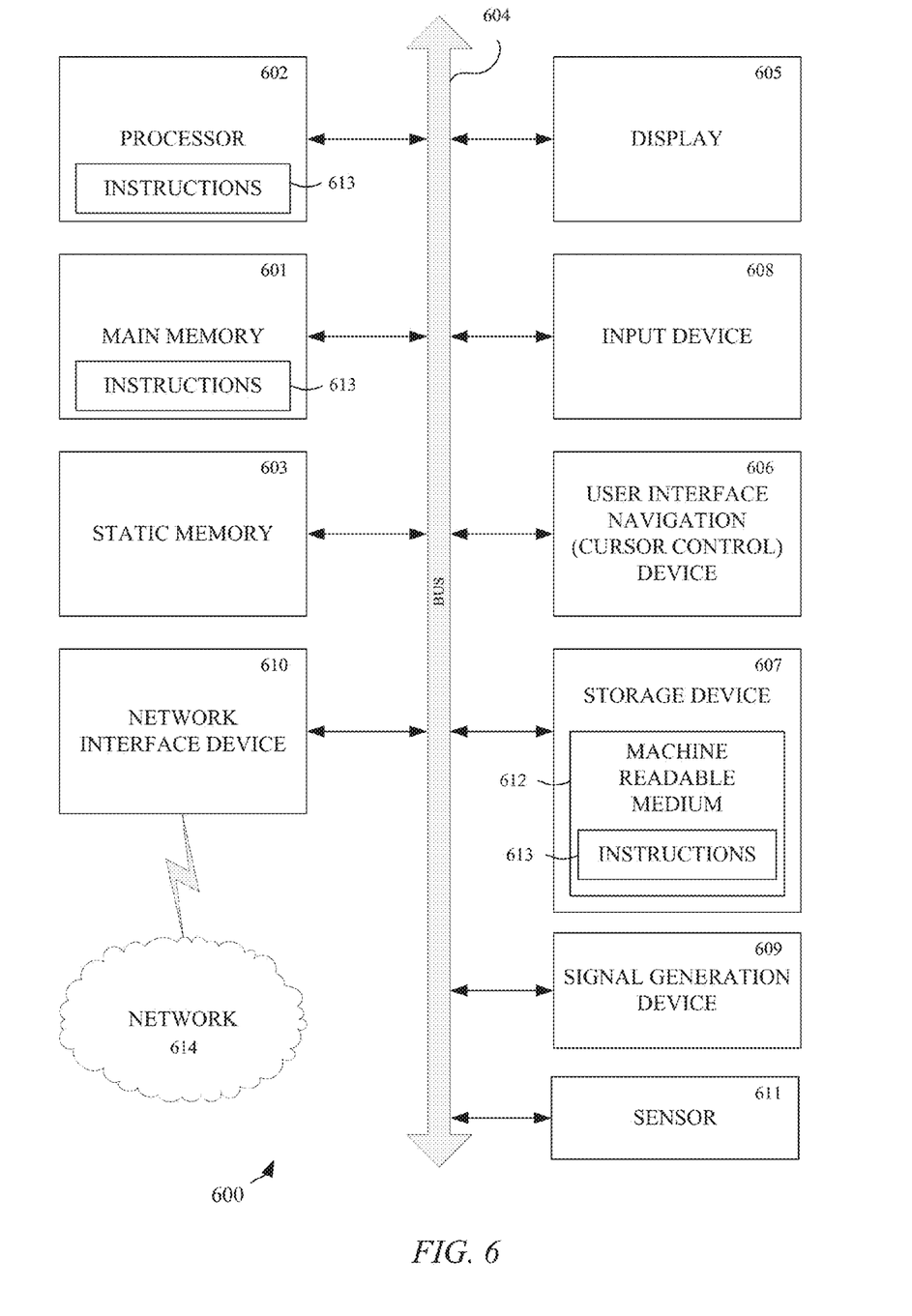
FIG. 6 is a block diagram of a machine in the example form of a computer system within which a set of instructions, for causing the machine to perform any one or more of the methodologies discussed herein, may be executed.

FIG. 6 is a block diagram of a machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 601 and a static memory 603, which communicate with each other via a bus 604. The computer system 600 may further include a video display unit 605 (e.g., a liquid crystal display (LCD) or a cathode ray tube (CRT)). The computer system 600 also includes an alphanumeric input device 608 (e.g., a keyboard or a touch-sensitive display screen), a user interface (UI) navigation device 606 (e.g., a mouse). The computer system 600 may additionally include a storage device 607 (e.g., drive unit), a signal generation device 609 (e.g., a speaker), a network interface device 610, and one or more sensors 611, such as a global positioning system sensor, compass, accelerometer, or other sensor.

Machine-Readable Medium

The drive unit 607 includes a machine-readable medium 612 on which is stored one or more sets of instructions and data structures (e.g., software 613) embodying or utilized by any one or more of the methodologies or functions described herein. The instructions 613 may also reside, completely or at least partially, within the main memory 601 and/or within the processor 602 during execution thereof by the computer system 600, the main memory 601 and the processor 602 also constituting machine-readable media.

While the machine-readable medium 612 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 613 may further be transmitted or received over a communications network 614 using a transmission medium. The instructions 613 may be transmitted using the network interface device 610 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi® and WiMax® networks). The term "transmission medium" shall be taken to include any intangible medium that is capable of storing, encoding or carrying instructions for execution by the machine, and includes digital or analog communications signals or other intangible media to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
    accessing a dependency specification that pertains to a first product, the product being a collection of artifacts, the product providing a software functionality;
    determining, by a machine including a memory and at least one processor, based on the dependency specification, that the first product has a dependency on a second product; accessing metadata pertaining to the second product;
    identifying a valid version of the second product based on the metadata, the valid version being usable at build time of the first product;
    identifying a third product based on the metadata pertaining to the second product, the third product having a dependency on a vulnerable version of the second product, the vulnerable version having code including a code vulnerability; and
    upgrading the dependency of the third product based on the valid version of the second product.

2. The computer-implemented method of claim 1, wherein the metadata is included in a catalogue file that includes information pertaining to one or more versions of the second product, a live date for each of the one or more versions, an end-of-life date for each of the one or more versions, and a pruned-version flag that indicates that a particular version is not usable.

3. The computer-implemented method of claim 1, wherein the artifacts are heterogeneous.

4. The computer-implemented method of claim 1, wherein the second product has one or more versions, each of the one or more versions of the second product having an end-of-life date that indicates a date when each of the one or more versions can no longer be used; and
    wherein the identifying of the valid version includes selecting a version of the one or more versions of the second product having an end-of life date that has not transpired.

5. The computer-implemented method of claim 4, wherein the selecting includes:
    determining that one or more of the versions of the second product have end-of life dates that have not transpired; and
    selecting the valid version from the one or more of the versions that have end-of life dates that have not transpired based on applying a version selection rule to the one or more of the versions that have end-of life dates that have not transpired.

6. The computer-implemented method of claim 1, wherein the identifying of the valid version includes confirming that the valid version functions at a pre-determined level of quality of service based on testing the valid version according to one or more quality of service criteria.

7. The computer-implemented method of claim 1, further comprising identifying, based on the metadata pertaining to the second product, a status of each of one or more versions of the second product including the valid version, and
    wherein the identifying of the valid version is based on the identified status of the valid version.

8. The computer-implemented method of claim 1, wherein the second product has a plurality of versions, each of the plurality of versions having a life-cycle expiring on an end-of-life date associated with the respective version of the second product, and wherein the identifying of the valid version includes:
- calculating a period of time remaining in the respective life-cycle of each of the versions based on the end-of-life date of each of the versions;
- identifying one or more of the versions of the second product that have a corresponding calculated period of time that is equal to or greater than a pre-determined threshold period; and
- selecting the valid version from the identified one or more of the versions according to a version selection rule.

9. The computer-implemented method of claim 8, wherein the version selection rule requires selecting a highest version of the second product.

10. The computer-implemented method of claim 8, wherein the version selection rule requires selecting a particular version of the second product.

11. The computer-implemented method of claim 1, wherein the dependency of the third product on the vulnerable version of the second product is indicated in a dependency specification that pertains to the third product; and
- wherein the upgrading of the dependency includes changing a version identifier in the dependency specification from a first identifier that specifies the vulnerable version to a second identifier that specifies the valid version.

12. The computer-implemented method of claim 1, further comprising:
- receiving a command to build the first product; and
- in response to receiving the command, executing the command to build the first product based on the valid version of the second product.

13. A system comprising:
- a non-transitory machine-readable medium for storing instructions that, when executed by one or more hardware processors of a machine, cause the machine to perform operations comprising:
  - accessing a dependency specification that pertains to a first product, the product being a collection of artifacts, the product providing a software functionality;
  - determining, based on the dependency specification, that the first product has a dependency on a second product;
  - accessing metadata pertaining to the second product;
  - identifying a valid version of the second product based on the metadata, the valid version being usable at build time of the first product;
  - identifying a third product based on the metadata pertaining to the second product, the third product having a dependency on a vulnerable version of the second product, the vulnerable version having code including a code vulnerability; and
  - upgrading the dependency of the third product based on the valid version of the second product.

14. The system of claim 13, wherein the second product has one or more versions, each of the one or more versions of the second product having an end-of-life date that indicates a date when each of the one or more versions can no longer be used; and
- wherein the identifying of the valid version includes selecting a version of the one or more versions of the second product having an end-of life date that has not transpired.

15. The system of claim 14, wherein the selecting includes:
- determining that one or more of the versions of the second product have end-of life dates that have not transpired; and
- selecting the valid version from the one or more of the versions that have end-of life dates that have not transpired based on applying a version selection rule to the one or more of the versions that have end-of life dates that have not transpired.

16. The system of claim 13, wherein the operations further comprise:
- identifying, based on the metadata pertaining to the second product, a status of each of one or more versions of the second product including the valid version, and
- wherein the identifying of the valid version is based on the identified status of the valid version.

17. The system of claim 13, wherein the second product has a plurality of versions, each of the plurality of versions having a life-cycle expiring on an end-of-life date associated with the respective version of the second product, and wherein the identifying of the valid version includes:
- calculating a period of time remaining in the respective life-cycle of each of the versions based on the end-of-life date of each of the versions;
- identifying one or more of the versions of the second product that have a corresponding calculated period of time that is equal to or greater than a pre-determined threshold period; and
- selecting the valid version from the identified one or more of the versions according to a version selection rule.

18. A non-transitory machine-readable storage medium comprising instructions that when executed by one or more processors of a machine, cause the machine to perform operations comprising:
- accessing a dependency specification that pertains to a first product, the product being a collection of artifacts, the product providing a software functionality;
- determining, based on the dependency specification, that the first product has a dependency on a second product;
- accessing metadata pertaining to the second product;
- identifying a valid version of the second product based on the metadata, the valid version being usable at build time of the first product;
- identifying a third product based on the metadata pertaining to the second product, the third product having a dependency on a vulnerable version of the second product, the vulnerable version having code including a code vulnerability; and
- upgrading the dependency of the third product based on the valid version of the second product.

\* \* \* \* \*